US012341241B2

(12) United States Patent
Bai

(10) Patent No.: US 12,341,241 B2
(45) Date of Patent: Jun. 24, 2025

(54) RADOME HAVING MULTI-SIZE METAL PATTERNS AND RADAR DEVICE USING THE SAME

(71) Applicant: Alpha Networks Inc., Hsinchu (TW)

(72) Inventor: Ta-Chuan Bai, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 113 days.

(21) Appl. No.: 18/523,966

(22) Filed: Nov. 30, 2023

(65) Prior Publication Data

US 2024/0402287 A1 Dec. 5, 2024

(30) Foreign Application Priority Data

May 31, 2023 (TW) ................................ 112120212

(51) Int. Cl.
*H01Q 1/42* (2006.01)

(52) U.S. Cl.
CPC ............. *H01Q 1/425* (2013.01); *H01Q 1/422* (2013.01)

(58) Field of Classification Search
CPC .......... H01Q 1/42; H01Q 1/421; H01Q 1/422; H01Q 1/424; H01Q 1/425
See application file for complete search history.

(56) References Cited

U.S. PATENT DOCUMENTS

2021/0083398 A1* 3/2021 Ko ........................ H01Q 21/061
2021/0184351 A1* 6/2021 Eleftheriades ........ H01Q 3/2658
2021/0382169 A1 12/2021 Achour et al.
2023/0114625 A1 4/2023 Lier et al.

FOREIGN PATENT DOCUMENTS

TW I354400 12/2011
TW I420738 12/2013
TW I666823 7/2019

OTHER PUBLICATIONS

Huanhuan Peng et al. "Gain Enhancem of Patch Antenna Using Metasurface Lens.", 2021 IEEE International Symposium on Antennas and Propagation and USNC-URSI Radio Science Meeting (APS/URSI), IEEE, Dec. 4, 2021. pp. 867-868.
Taiwan Intellectual Property Office , "Notice of allowance", issued on May 31, 2024.
European Patent Office , "European search report", issued on May 23, 2024.

* cited by examiner

*Primary Examiner* — Daniel Munoz
(74) *Attorney, Agent, or Firm* — WPAT, PC

(57) ABSTRACT

A radome having multi-size metal patterns and a radar device using the radome are provided. The radome includes alternately-arranged dielectric substrates and metal layers. Each metal layer includes metal frames and metal patterns wherein the metal patterns are electrically insulated from each other. A gap width corresponding to one metal pattern of one metal layer is a width of a gap defined between the metal pattern and a nearest metal frame to the metal pattern. The gap widths corresponding to the metal patterns are increasing, decreasing and further increasing in sequence along a radial direction extending from a center to an outer edge of the metal layer. The outmost layers at both sides of the radome are metal layers. The metal layers have substantially identical layout.

6 Claims, 9 Drawing Sheets

| Frequency | Peak gain (dBi) | HPBW (degree) |
|---|---|---|
| 14 GHz | 16.9 | 26 |
| 14.25GHz | 17 | 25.6 |
| 14.5GHz | 17.2 | 25.2 |

FIG. 4

| Frequency | Peak gain (dBi) | HPBW (degree) |
|---|---|---|
| 14GHz | 12.5 | 40 |
| 14.25GHz | 12.5 | 41.3 |
| 14.5GHz | 12 | 43.3 |

FIG. 5

| Frequency | Peak gain (dBi) | HPBW (degree) |
|---|---|---|
| 14 GHz | 16.9 | 26.1 |
| 14.25GHz | 17 | 25.7 |
| 14.5GHz | 17.2 | 25.3 |

FIG. 6

| Frequency | Peak gain (dBi) | HPBW (degree) |
|---|---|---|
| 14GHz | 12.5 | 43.2 |
| 14.25GHz | 12.5 | 43.5 |
| 14.5GHz | 12.5 | 43.6 |

FIG. 7

| Frequency | Peak gain (dBi) | HPBW (degree) |
|---|---|---|
| 10.7GHz | 16.1 | 28.8 |
| 11.7GHz | 16.8 | 26.2 |
| 12GHz | 17.1 | 25.6 |

FIG. 9

| Frequency | Peak gain (dBi) | HPBW (degree) |
|---|---|---|
| 10.7GHz | 9.4 | 59.2 |
| 11.7GHz | 12.9 | 37.4 |
| 12GHz | 10.9 | 46 |

FIG. 10

| Frequency | Peak gain (dBi) | HPBW (degree) |
|---|---|---|
| 10.7GHz | 16.1 | 28.3 |
| 11.7GHz | 16.8 | 26.2 |
| 12GHz | 17.1 | 25.7 |

FIG. 11

| Frequency | Peak gain (dBi) | HPBW (degree) |
|---|---|---|
| 10.7GHz | 11 | 40 |
| 11.7GHz | 13 | 42.5 |
| 12GHz | 12.7 | 45.7 |

FIG. 12

RADOME HAVING MULTI-SIZE METAL PATTERNS AND RADAR DEVICE USING THE SAME

FIELD OF THE INVENTION

The present disclosure relates to a radome and a radar device using the radome, and particularly to a radome having multi-size metal patterns and a radar device using the radome.

BACKGROUND OF THE INVENTION

The array antenna has advantages of compact size, high reliability and multibeam applicability. Hence, the array antenna is widely applied to various high-tech products. For example, a modern satellite usually adopts an array antenna as major antenna structure. However, the array antenna transmits and receives wireless signals through beams with a narrow beam width. The signals fallen outside the coverage of the narrow beam width are probably subject to signal distortion or loss. Therefore, when an array antenna is used to transmit signals, it is necessary to increase the quantity of ground stations or transmitting/receiving field of view to ensure good satellite communication in all weathers. Nevertheless, the technology of increasing either of the quantity and the transmitting/receiving field of view of the ground stations requires much money or manpower. Therefore, the problem indeed obstructs the development of satellite communication.

SUMMARY OF THE INVENTION

The disclosure provides a radome which can widen the beam width of beams for wireless signals and a radar device using the radome. The beam width widened by the radome can enlarge the field of view of the radar device.

An aspect of the present disclosure provides a radome having multi-size metal patterns. The radome includes dielectric substrates and metal layers. Each metal layer includes metal frames and metal patterns wherein the metal patterns are electrically insulated from each other. A gap width corresponding to one metal pattern of a metal layer is a width of a gap defined between the metal pattern and a nearest metal frame to the one metal pattern. The gap widths corresponding to the metal patterns have a trend of first increasing, then decreasing and finally increasing along a radial direction extending from a center to an outer edge of the metal layer. The dielectric substrates and the metal layers are alternately arranged, and the outmost layers at both sides of the radome are metal layers. The metal layers of the radome have substantially identical layout.

In an embodiment, the metal layer includes non-overlapping blocks of equal size. Each block includes one metal pattern and optionally includes one metal frame surrounding the metal pattern. The blocks are square blocks arranged in an array.

Another aspect of the present disclosure provides a radar device using a radome having multi-size metal patterns. The radar device includes an array antenna and a radome. The array antenna is configured to transmit or receive an electromagnetic wave. The radome includes dielectric substrates and metal layers. Each metal layer includes metal frames and metal patterns wherein the metal patterns are electrically insulated from each other. A gap width corresponding to one metal pattern of a metal layer is a width of a gap defined between the metal pattern and a nearest metal frame to the one metal pattern. The gap widths corresponding to the metal patterns have a trend of first increasing, then decreasing and finally increasing along a radial direction extending from a center to an outer edge of the metal layer. The dielectric substrates and the metal layers are alternately arranged, and the outmost layers at both sides of the radome are metal layers. The metal layers of the radome have substantially identical layout. There is a predetermined distance between the array antenna and the radome, and the array antenna transmits or receives the electromagnetic wave passing through the radome.

In an embodiment, the metal layer includes non-overlapping blocks of equal size. Each block includes one metal pattern and optionally includes one metal frame surrounding the metal pattern. The blocks are square blocks arranged in an array.

According to the present disclosure, the sizes of the metal patterns on the radome are adjusted based on their positions on the radome to change the phase of the electromagnetic waves emitted to the radome. The electromagnetic waves emitted to different portions of the radome are refracted with different refraction angles to achieve divergence effect. Therefore, if a radar device adopts the radome having multi-size metal patterns of the present disclosure, the electromagnetic waves passing through the random diverge because of the widened beam width so as to cover broader region. Hence, the receiver station has a larger receiving angle during reception of the electromagnetic waves.

BRIEF DESCRIPTION OF THE DRAWINGS

The advantages of the present disclosure will become more readily apparent to those ordinarily skilled in the art after reviewing the following detailed description and accompanying drawings, in which:

FIG. 4 shows peak gain and half-power beam width of an array antenna without using a radome of the present disclosure wherein the data are measured in the TE mode.

FIG. 5 shows peak gain and half-power beam width of a radar device adopting the radome of FIG. 2B wherein the data are measured in the TE mode.

FIG. 6 shows peak gain and half-power beam width of the array antenna without using the radome of the present disclosure wherein the data are measured in the TM mode.

FIG. 7 shows peak gain and half-power beam width of the radar device adopting the radome of FIG. 2B wherein the data are measured in the TM mode.

FIG. 9 shows peak gain and half-power beam width of an array antenna without using a radome of the present disclosure wherein the data are measured in the TE mode.

FIG. 10 shows peak gain and half-power beam width of a radar device adopting the radome of FIG. 8 wherein the data are measured in the TE mode.

FIG. 11 shows peak gain and half-power beam width of an array antenna without using a radome of the present disclosure wherein the data are measured in the TM mode.

FIG. 12 shows peak gain and half-power beam width of the radar device adopting the radome of FIG. 8 wherein the data are measured in the TM mode.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
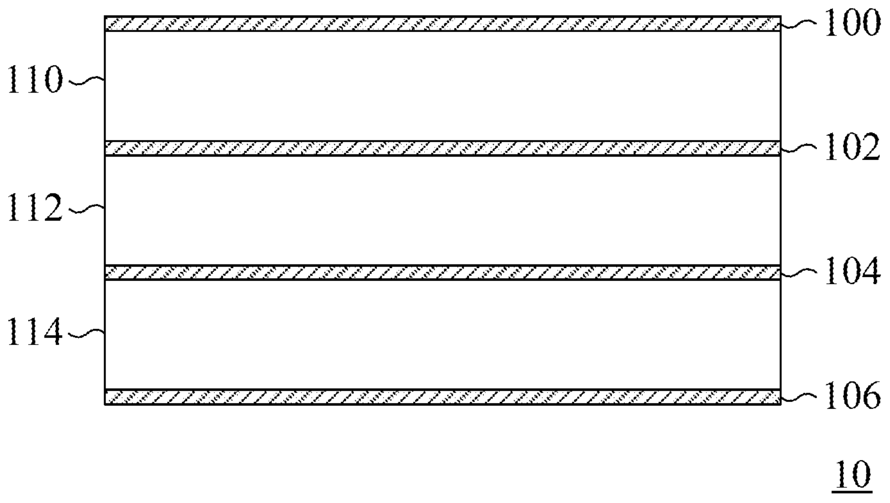
FIG. 1 is a side view of a radome having multi-size metal patterns according to an embodiment of the present disclosure.

Please refer to FIG. 1, which is a side view of a radome having multi-size metal patterns according to an embodiment of the present disclosure. As shown in the diagram, the radome 10 of the embodiment includes metal layers 100, 102, 104 and 106 and dielectric substrates 110, 112 and 114. The metal layers 100~106 and the dielectric substrates 110~114 are alternately arranged, and the outmost layers on both sides are metal layers.

For widening the beam width of the electromagnetic waves passing through the radome to increase divergence, the present disclosure takes advantages of multi-size metal patterns with specific layout. Gaps are formed between the metal patterns and the surrounding metal frames. In the specification, the gap width corresponding to a metal pattern means the width of the gap defined between the metal pattern and the nearest metal frame (the metal frame nearest to the metal pattern). The gap widths show a specific variation tendency along a specific direction to shift the phase from a negative phase to a positive phase and then back to the negative phase so as to change the transmission direction of the electromagnetic waves to obtain divergence effect. Theoretically, one dielectric substrate and one metal layer with multi-size metal patterns can change the beam width of the electromagnetic waves passing through the radome to increase divergence. Nevertheless, in addition to widening the beam width, the radome having alternately-arranged metal layers and dielectric substrates can further suppress the side lobes to prevent from signal distortion in the main lobe in the radiation pattern when divergence effect is desired. The layouts of different metal layers of the radome are substantially identical to each other.

Figure 2A:
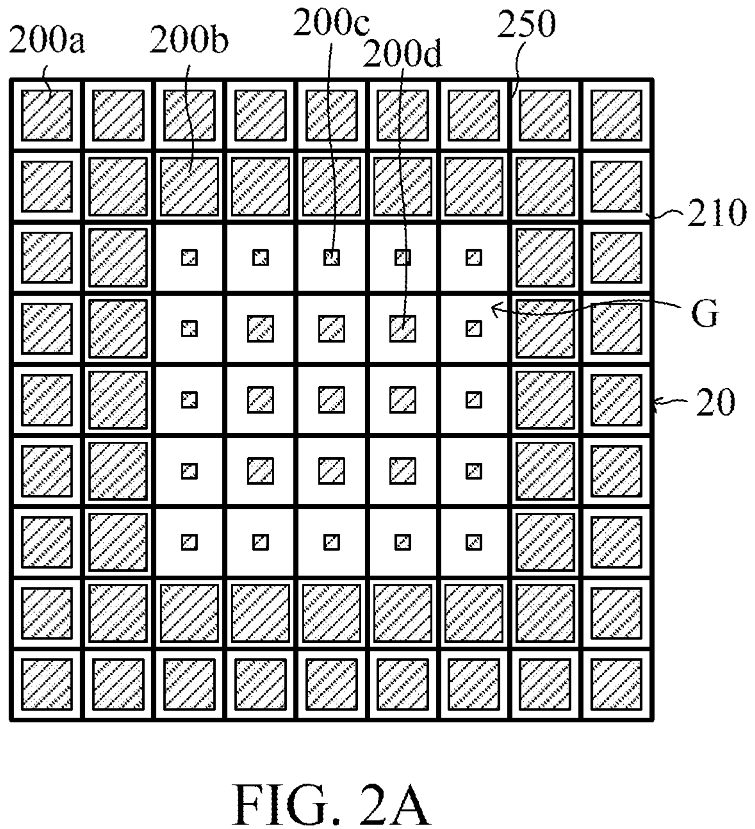
FIG. 2A is a top view of a metal layer of a radome having multi-size metal patterns according to an embodiment of the present disclosure.

Please refer to FIG. 2A, which is a top view of a metal layer of a radome having multi-size metal patterns according to an embodiment of the present disclosure. The radome in FIG. 2A is designed for $K_U$ band transmitter at the frequency range of 14 GHz~14.5 GHz, and the parameters given below are obtained based on this frequency range. It is to be noted that the invention is not limited by these given parameters. The size, parameters or shape of radome for use at other frequency ranges may be derived from the concepts of the present disclosure. Initial parameters of the radome could be obtained according to the equations provided in known references (e.g. Ahmed H. Abdelrahman, Fan Yang, Atef Z. Elsherbeni, and Payam Nayeri, "Analysis and Design of Transmit array Antennas", 2017) and the design factors involving the material properties of the dielectric substrate, the relative position between the radome and the array antenna, and the frequency band of the emitted signals. After the initial parameters are obtained, electromagnetic simulation software can be used to optimize the parameters.

In the embodiment with reference to FIG. 2A, the metal layer is disposed on an adjacent dielectric substrate serving as a base 20 to form the metal patterns on the base 20. Referring to the radome in FIG. 1, the base for the metal layer 100 is the dielectric substrate 110; the base for the metal layer 102 is one of the dielectric substrates 110 and 112; the base for the metal layer 104 is one of the dielectric substrates 112 and 114; and the base for the metal layer 106 is the dielectric substrate 114.

To design and form the metal patterns in a relatively simple manner, metal lines (grids) are provided on the base 20 to divide the region on the base 20 into non-overlapping blocks 210 of equal size and dimension. There is just one metal pattern in each block 210, and the metal lines surrounding the block 210 could be viewed as the position reference for forming the metal pattern in the block 210. Therefore, the metal patterns disposed in corresponding blocks 210 are electrically insulated from each other. In the embodiment, to widen the beam width of the electromagnetic waves passing through the radome, the gap widths corresponding to the metal patterns (i.e. the widths of the gaps G defined between the metal patterns and the nearest metal frames) are increasing, decreasing and increasing in sequence along the radially outward direction (i.e. a radial direction extending from a center to the outer edge of the metal layer) to shift the phase from a negative phase to a positive phase and then back to the negative phase so as to change the transmission direction of the electromagnetic waves.

Concretely, in the embodiment with reference to FIG. 2A, the metal lines 250 form metal frames of equal size and dimension at boundaries of the blocks 210 of the base 20. Each metal pattern 200*a*, 200*b*, 200*c*, 200*d* is surrounded by a corresponding metal frame. Each metal pattern 200*a*, 200*b*, 200*c*, 200*d* is concentric with the corresponding metal frame. Based on this structure, the metal frame surrounding a specific metal pattern is the nearest metal frame to the specific metal pattern according to the definition. The shortest distance between the outer edge of the metal pattern and the nearest metal frame (i.e. the gap width corresponding to the metal pattern) can be calculated from the size of the metal pattern. Larger metal pattern results in smaller gap width corresponding to the metal pattern. Also, smaller metal pattern results in greater gap width. Therefore, to provide the metal patterns, from the center to the outer edge of the metal layer, with the gap widths in the trend of first increasing, then decreasing and finally increasing along the radially outward direction, the sizes of the metal patterns arranged along the radially outward direction first decrease gradually, then increase gradually and further decrease gradually. For example, in FIG. 2A, the metal patterns 200*c* are smaller than the metal patterns 200*d*, the metal patterns 200*b* are larger than the metal patterns 200*c*, and the metal patterns 200*a* are smaller than the metal patterns 200*b*.

To vary the gap widths corresponding to the metal patterns, the above embodiment proposes to change the sizes of the metal patterns and fix the size of the metal frames. In other cases, the gap widths could be adjusted by changing the sizes of the metal frames and fix the size of the metal patterns, or changing both sizes of the metal frames and the metal patterns. Please refer to FIG. 2B, which is a top view of a metal layer of a radome having multi-size metal patterns according to another embodiment of the present disclosure. In this embodiment, every region and associated surrounding metal frame 270*a*, 270*b* or 270*d* are collectively viewed as one block (similar to block 210 of FIG. 2A). That is to say, the metal layer of FIG. 2B includes blocks which have metal frames and non-overlapping surrounded regions, and just one metal pattern is disposed in each block. Concretely, the line width of the metal frames 270*a*, 270*b* and 270*d* is about 0.2 mm; the metal frame 270*a* are square frame having an inside opening of about 8.6 mm*8.6 mm and an outside dimension of about 9 mm*9 mm, the metal frame 270*b* is a square frame having an inside opening of about 6.8 mm*6.8 mm and an outside dimension of about 7.2 mm*7.2 mm; the metal frames 270*d* are square frames having an inside opening of about 7.6 mm*7.6 mm and an outside dimension of about 8 mm*8 mm; the metal patterns 260*a* are square patterns of about 3.5 mm*3.5 mm; the metal patterns 260*b* are square patterns of about 4.25 mm*4.25 mm; the metal patterns 260*c* are square patterns of about 1 mm*1 mm; and the metal patterns 260*d* are square patterns of about 1.5 mm*1.5 mm. According to the design parameters, the gap width corresponding to the metal patterns 260*a* is about 2.55 mm, the gap width corresponding to the metal patterns 260*b* is about 1.275 mm, and the gap width corresponding to the metal patterns 260*d* is about 3.05 mm.

Figure 2B:
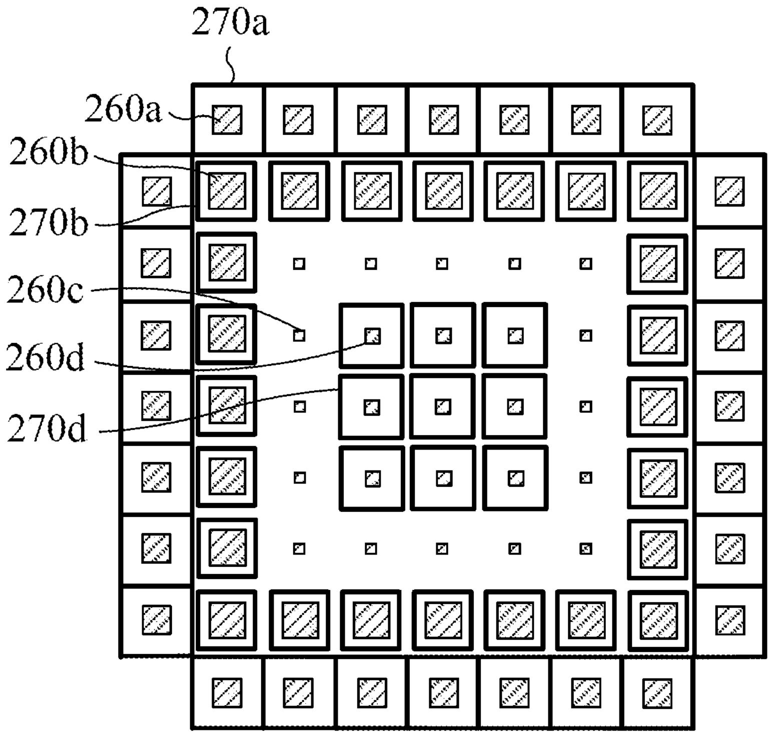
FIG. 2B is a top view of a metal layer of a radome having multi-size metal patterns according to another embodiment of the present disclosure.

It is to be noted that the present disclosure takes advantages of electromagnetic coupling between the metal patterns and the neighboring metal frames to adjust the phases of the electromagnetic waves. If the electromagnetic coupling phenomenon between one metal pattern and the corresponding metal frame is insignificant and negligible, the metal frame could be omitted to reduce the production cost. For example, the electromagnetic coupling phenomenon between the metal patterns 260*c* and the metal frames of the radome in FIG. 2B is negligible at the frequency band for the radome. Therefore, no metal structure such as the metal frame 270*a*, 270*b* or 270*d* is provided to surround the metal patterns 260*c*. In this case, the gap width means the distance between the outer edge of the metal pattern 260*c* and the nearest metal frame. For example, the gap width corresponding to the metal pattern 260*c* could be the shortest distance between the outer edge of the metal pattern 260*c* and the metal frame 270*b* or the shortest distance between the outer edge of the metal pattern 260*c* and the metal frame 270*d*.

It is observed from FIG. 2B that the metal pattern 260*c* is smaller than the metal pattern 260*d*, and no metal frame is provided in the block associated with the metal pattern 260*c* in the embodiment. Hence, the distance between the outer edge of the metal pattern 260*c* and the nearest metal frame 270*d* is greater than the distance between the outer edge of the metal pattern 260*d* and the metal frame 270*d*. Similarly, it is observed that the metal pattern 260*c* is smaller than the metal pattern 260*b*, and no metal frame is provided in the block associated with the metal pattern 260*c*. Hence, the distance between the outer edge of the metal pattern 260*c* and the nearest metal frame 270*b* is greater than the distance between the outer edge of the metal pattern 260*b* and the metal frame 270*b*. In conclusion, in FIG. 2B, the gap width corresponding to the metal patterns 260*d* is smaller than the gap width corresponding to the metal patterns 260*c* (i.e. the gap width is first increasing), the gap width corresponding to the metal patterns 260*c* is greater than the gap width corresponding to the metal patterns 260*b* (i.e. the gap width is then decreasing), and the gap width corresponding to the metal patterns 260*b* is smaller than the gap width corresponding to the metal patterns 260*a* (i.e. the gap width is finally increasing). Hence, the embodiment of FIG. 2B meets the above-described design principles, wherein the gap widths corresponding to the metal patterns (i.e. the widths of the gaps defined by the metal patterns and the nearest metal frames) are increasing, decreasing and increasing in sequence along the radially outward direction.

Figure 2C:
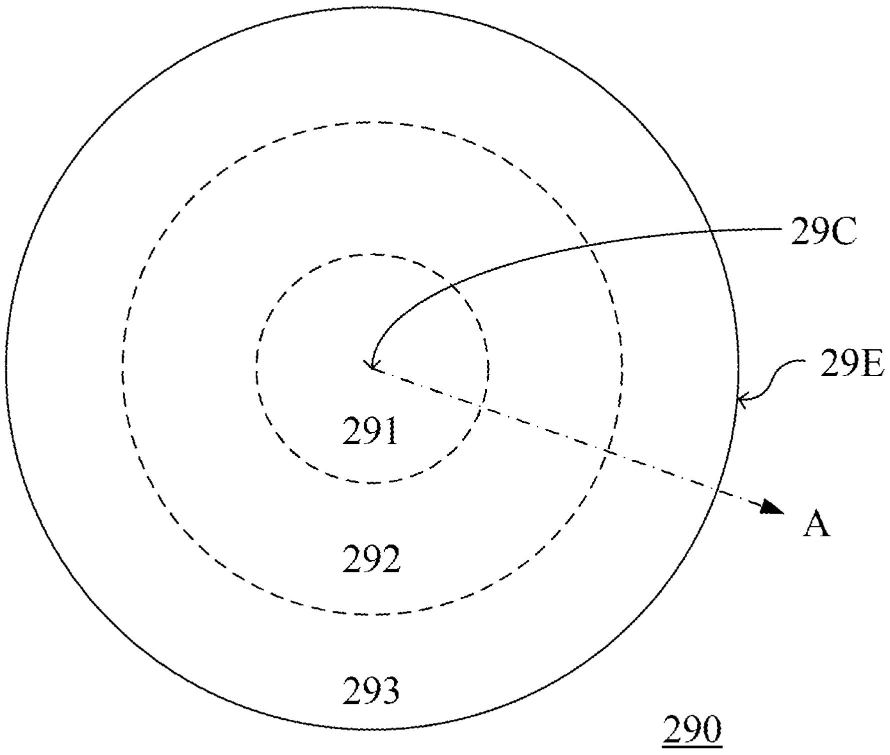
FIG. 2C is a schematic diagram illustrating a metal layer of a radome having multi-size metal patterns according to a further embodiment of the present disclosure.

The embodiments of FIGS. 2A and 2B show the simplest design, e.g. the radome having four-size metal patterns. Please refer to FIG. 2C, which is a schematic diagram illustrating a metal layer of a radome having multi-size metal patterns according to a further embodiment of the present disclosure. The metal layer 290 has a first gap width-increasing region 291, a gap width decreasing region 292 and a second gap width-increasing region 293. The first gap width-increasing region 291 is arranged at the center portion of the metal layer 290 (or the radome 10), the second gap width-increasing region 293 is arranged near the outer edge 29E of the metal layer 290 (or the radome 10), and the gap width-decreasing region 292 is arranged between the first gap width-increasing region 291 and the second gap width-increasing region 293. Every region 291, 292, 293 includes more than one metal pattern along the radial direction (e.g. the radially outward direction A). In the first gap width-increasing region 291, the gap width corresponding to the metal pattern closer to the center 29C is smaller than or equal to that closer to the boundary between the first gap width-increasing region 291 and the gap width-decreasing region 292, while the gap widths of the metal patterns in the first gap width-increasing region 291 substantially show a trend towards greater gap widths along the radially outward direction A. In the gap width-decreasing region 292, the gap width corresponding to the metal pattern closer to the boundary between the first gap width-increasing region 291 and the gap width-decreasing region 292 is greater than or equal to that closer to the boundary between the gap width-decreasing region 292 and the second gap width-increasing region 293, while the gap widths of the metal patterns in the gap width-decreasing region 292 substantially show a trend towards smaller gap widths along the radially outward direction A. In the second gap width-increasing region 293, the gap width corresponding to the metal pattern closer to the boundary between the gap width-decreasing region 292 and the second gap width-increasing region 293 is smaller than or equal to that closer to the outer edge 29E of the metal layer 290, while the gap widths of the metal patterns in the second gap width-increasing region 293 substantially show a trend towards greater gap widths along the radially outward direction A. In conclusion, viewing from the radially outward direction A, a first gap having a locally greatest gap width is located between the center 29C and the outer edge 29E of the metal layer 290, and a second gap having a locally smallest gap width is located between the first gap and the outer edge 29E of the metal layer 290. Starting from the first gap, the gap widths decrease towards the center 29C of the metal layer 290 and the second gap, respectively. By contrary, starting from the second gap, the gap widths increase towards the first gap and the outer edge 29E of the metal layer 290, respectively. It is to be noted that the shapes of the regions 291~293 are not limited to the embodiment. Further, the gap widths could be adjusted by changing the sizes of either of the metal patterns or the metal frames, or the both.

Figure 3A:
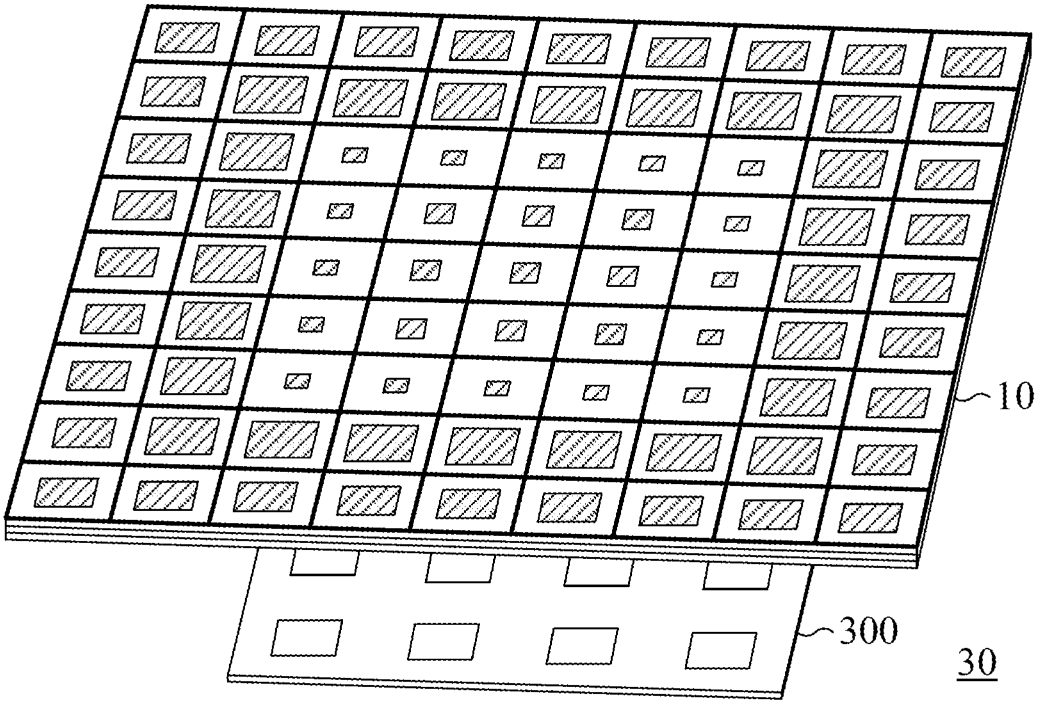
FIG. 3A is a schematic diagram illustrating a radar device adopting the radome having multi-size metal patterns according to an embodiment of the present disclosure.
Figure 3B:
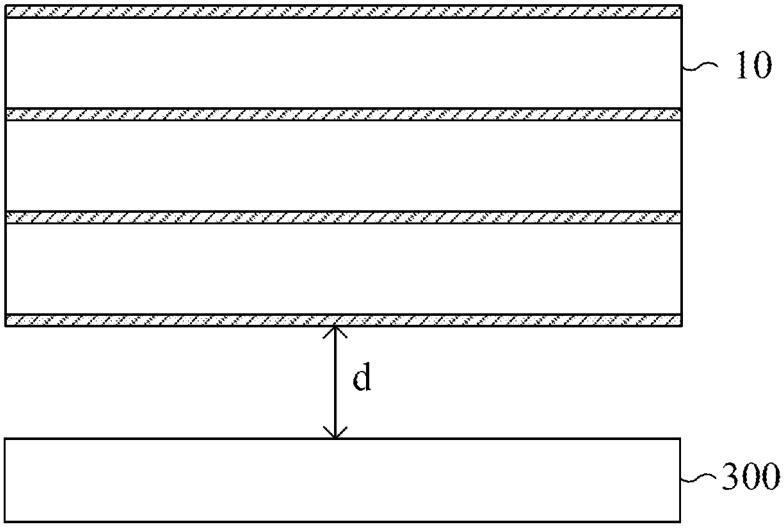
FIG. 3B is a side view of the radar device in FIG. 3A.

Please refer to both FIGS. 3A and 3B, wherein FIG. 3A is a schematic diagram illustrating a radar device adopting the radome having multi-size metal patterns according to an embodiment of the present disclosure, and FIG. 3B is a side view of the radar device of FIG. 3A. In the embodiment, the radar device 30 includes the radome 10 of FIG. 1 and an array antenna 300. The radome 10 and the array antenna 300 are a distance d apart, and the radiation pattern (e.g. a first radiation pattern) of the electromagnetic waves emitted by the array antenna 300 is transformed into a different radiation pattern (e.g. a second radiation pattern) after the electromagnetic waves pass through the radome 10. Using the design parameters in FIG. 2B and setting the distance d to be or greater than twice as long as the wavelength of the electromagnetic waves emitted by the array antenna 300, the peak gain and half-power beam width (HPBW) are measured in the transverse electric (TE) mode (FIGS. 4 and 5) and the transverse magnetic (TM) mode (FIGS. 6 and 7). FIG. 4 shows the measurement data of the array antenna 300 in the TE mode, FIG. 5 shows the measurement data of the radar device 30 including the array antenna 300 and the radome 10 covering thereon in the TE mode, FIG. 6 shows the measurement data of the array antenna 300 in the TM mode, and FIG. 7 shows the measurement data of the radar device 30 including the array antenna 300 and the radome 10 covering thereon in the TM mode. It is observed from the measurement data in FIGS. 4~7 that compared to the uncovered array antenna 300, the radar device 30 further including the radome 10 shown in FIG. 2B has smaller peak gain, but the half-power beam width of the radar device 30 is increased significantly.

Figure 8:
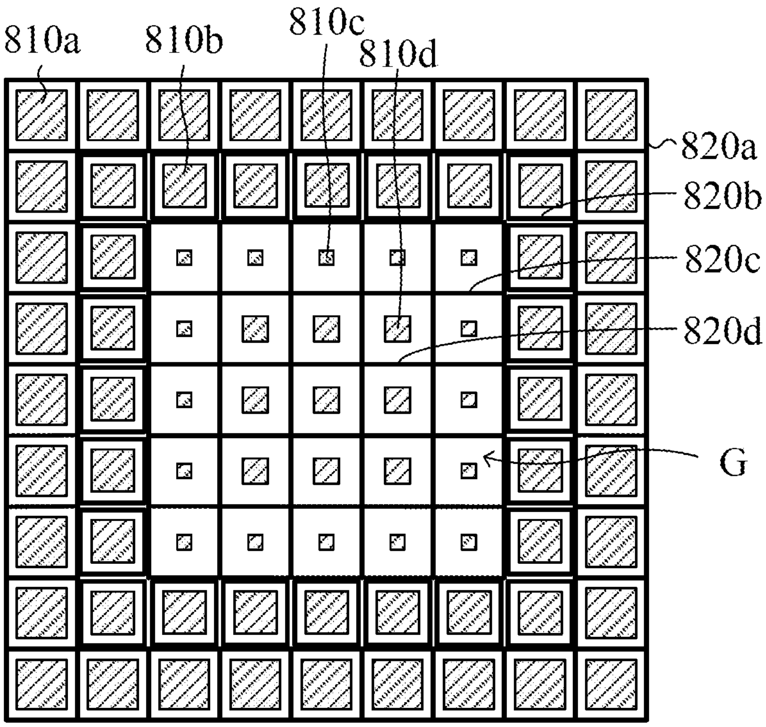
FIG. 8 is a top view of a metal layer of a radome having multi-size metal patterns according to a further embodiment of the present disclosure.

Although the given embodiment disposes the radome near the transmitter of the array antenna, the radome according to the concepts of the present disclosure can be also disposed near the receiver of the array antenna. In this situation, the sizes of the metal patterns on the radome should be designed and determined based on the frequency range of the receiver of the array antenna. FIG. 8 illustrates an embodiment of a radome designed to cooperate with an array antenna for $K_U$ band receiver at the frequency range of 10.7 GHz~12.7 GHz, and all metal layers of the radome can adopt the parameters given below.

Please refer to FIG. 8, which is a top view of a metal layer of a radome having multi-size metal patterns according to a further embodiment of the present disclosure. In the embodiment, every region and associated surrounding metal frame 820*a*, 820*b*. 820*c* or 820*d* are collectively viewed as one block (similar to block 210 of FIG. 2A). In other words, the metal layer of FIG. 8 includes blocks which have metal frames and non-overlapping surrounded regions, and just one metal pattern is disposed in each block. Concretely, the line width of the metal frames 820*a*, 820*b*, 820*c* and 820*d* is about 0.1 mm; the metal frames 820*a*, 820*c* and 820*d* are square frames having an inside opening of about 8.8 mm*8.8 mm and an outside dimension of about 9 mm*9 mm; the metal frames 820*b* are square frames having an inside opening of about 7.8 mm*7.8 mm and an outside dimension of about 8 mm*8 mm; the metal patterns 810*a* are square patterns of about 5 mm*5 mm; the metal patterns 810*b* are square patterns of about 4.25 mm*4.25 mm; the metal patterns 810*c* are square patterns of about 1.75 mm*1.75 mm; and the metal patterns 810*d* are square patterns of about 2.5 mm*2.5 mm.

According to the design parameters, the gap width corresponding to the metal patterns 810*a* is about 1.9 mm, the gap width corresponding to the metal patterns 810*b* is about 1.775 mm, the gap width corresponding to the metal patterns 810*c* is about 3.525 mm, and the gap width corresponding to the metal patterns 810*d* is about 3.15 mm. Hence, the embodiment of FIG. 8 meets the above-described design principles, wherein the gap widths corresponding to the metal patterns (i.e. the widths of the gaps G defined between the metal patterns and the nearest metal frames) have a trend of first increasing, then decreasing and finally increasing along the radially outward direction.

Using the design parameters in FIG. 8 and setting the distance d to be or more than twice as long as the wavelength of the electromagnetic waves for the array antenna 300 in FIGS. 3A and 3B, the peak gain and half-power beam width (HPBW) are measured in the TE mode (FIGS. 9 and 10) and the TM mode (FIGS. 11 and 12). FIG. 9 shows the measurement data of the array antenna 300 in the TE mode, FIG. 10 shows the measurement data of the radar device 30 including the array antenna 300 and the radome 10 covering thereon in the TE mode, FIG. 11 shows the measurement data of the array antenna 300 in the TM mode, and FIG. 12 shows the measurement data of the radar device 30 including the array antenna 300 and the radome 10 covering thereon in the TM mode. It is observed from the measurement data in FIGS. 9~12 that compared to the uncovered array antenna 300, the half-power beam width of the radar device 30 including the radome 10 shown in FIG. 8 is increased significantly.

In the above embodiments, the region on the base is divided into square blocks arranged in an array. However, the shape and the arrangement of the blocks can be modified on condition that the changes of phase of the electromagnetic waves result from the gap width adjustment can achieve desired divergence effect, and are not limited to the embodiments.

In conclusion, the sizes of the metal patterns on the radome of the present disclosure are adjusted based on their positions on the radome to change the phase of the electromagnetic waves emitted to the radome. The electromagnetic waves emitted to different portions of the radome are refracted with different refraction angles to achieve divergence effect. Therefore, if a radar device adopts the radome having multi-size metal patterns of the present disclosure, the electromagnetic waves passing through the random diverge because of the widened beam width so as to cover broader region. Hence, the receiver station has a larger receiving angle during reception of the electromagnetic waves.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A radome having multi-size metal patterns, comprising:
   - a plurality of dielectric substrates; and
   - a plurality of metal layers, each of which comprises a plurality of metal frames and a plurality of metal patterns wherein the metal patterns are electrically insulated from each other, a gap width corresponding to one of the metal patterns of a first metal layer among the metal layers being a width of a gap defined between the one metal pattern and a nearest one of the metal frames to the one metal pattern, wherein the gap widths corresponding to the metal patterns have a trend of first increasing, then decreasing and finally increasing along a radial direction extending from a center to an outer edge of the first metal layer, wherein the dielectric substrates and the metal layers are alternately arranged, and outmost layers at both sides of the radome are two of the metal layers, wherein the metal layers have substantially identical layout.

2. The radome according to claim 1, wherein the first metal layer comprises non-overlapping blocks of equal size, each of the blocks comprising one of the metal patterns and optionally comprising one of the metal frames surrounding the one metal pattern.

3. The radome according to claim 2, wherein the blocks are square blocks arranged in an array.

4. A radar device using a radome having multi-size metal patterns, comprising:

an array antenna for transmitting or receiving an electromagnetic wave; and the radome comprising:

a plurality of dielectric substrates; and a plurality of metal layers, each of which comprises a plurality of metal patterns and a plurality of metal frames wherein the metal patterns are electrically insulated from each other, a gap width corresponding to one of the metal patterns of a first metal layer among the metal layers being a width of a gap defined between the one metal pattern and a nearest one of the metal frames to the one metal pattern, wherein the gap widths corresponding to the metal patterns have a trend of first increasing, then decreasing and finally increasing along a radial direction extending from a center to an outer edge of the first metal layer, wherein the dielectric substrates and the metal layers are alternately arranged, and outmost layers at both sides of the radome are two of the metal layers, wherein the metal layers have substantially identical layout, wherein there is a predetermined distance between the array antenna and the radome, and the array antenna transmits or receives the electromagnetic wave passing through the radome.

5. The radar device according to claim 4, wherein the first metal layer comprises non-overlapping blocks of equal size, each of the blocks comprising one of the metal patterns and optionally comprising one of the metal frames surrounding the one metal pattern.

6. The radar device according to claim 5, wherein the blocks are square blocks arranged in an array.

* * * * *